United States Patent [19]
Frank et al.

[11] Patent Number: 5,026,119
[45] Date of Patent: Jun. 25, 1991

[54] BACK SUPPORT FOR MOTORCYCLES

[76] Inventors: Harvey A. Frank, 1321 S. Andrews Ave., Ft. Lauderdale, Fla. 33316; Rhoda Lynge, 4541 N.W. 6th St., Plantation, Fla. 33317

[21] Appl. No.: 898,728

[22] Filed: Aug. 14, 1986

Related U.S. Application Data

[63] Continuation of Ser. No. 655,208, Sep. 27, 1984, abandoned.

[51] Int. Cl.$^5$ .............................................. B60N 2/02
[52] U.S. Cl. ............................ 297/383; 257/DIG. 9; 16/300
[58] Field of Search ................. 297/383, 333, DIG. 9, 297/377, 366, 300, 376; 280/289; 16/299, 300

[56] References Cited

U.S. PATENT DOCUMENTS

| | | | |
|---|---|---|---|
| 36,976 | 11/1862 | Acker | 16/300 |
| 631,797 | 8/1899 | Krause | 16/300 X |
| 653,105 | 7/1900 | MacLeay | 297/300 |
| 1,001,610 | 8/1911 | Blaylock | 297/300 |
| 1,074,438 | 9/1913 | Kimpel | 297/377 |
| 1,102,899 | 7/1914 | Fox | 297/376 |
| 1,113,833 | 10/1914 | Ruff | 297/DIG. 9 |
| 1,146,675 | 7/1915 | Weed | 297/DIG. 9 |
| 1,238,087 | 8/1917 | Bawtinhimer et al. | 297/333 X |
| 1,578,780 | 3/1926 | Titus | 16/299 |
| 1,759,878 | 5/1930 | Zizzo | 297/333 X |
| 3,156,501 | 11/1964 | Harris | 297/333 |
| 3,486,767 | 12/1969 | Lujan | 280/289 |
| 4,030,750 | 6/1977 | Abram | 297/DIG. 9 X |
| 4,313,639 | 2/1982 | Ware | 297/366 |
| 4,447,088 | 5/1984 | Bodlovic | 297/DIG. 9 X |

FOREIGN PATENT DOCUMENTS

| | | | |
|---|---|---|---|
| 271045 | 1/1930 | Italy | 297/292 |
| 445755 | 2/1968 | Switzerland | 297/300 |

Primary Examiner—Peter A. Aschenbrenner

[57] ABSTRACT

A support for the back of a rider of a motorcycle having a seat for supporting a rider within a given seating range along the seat, includes a back rest, and a device connected to the back rest for continuously biasing the back rest against the back of the rider regardless of the posture of the rider and the position occupied by the rider within the given seating range along the seat.

17 Claims, 2 Drawing Sheets

BACK SUPPORT FOR MOTORCYCLES

This application is a continuation of application Ser. No. 655,208, filed Sept. 27, 1984, now abandoned.

The invention relates to a back support for riders of a motorcycle, seated in the driver's or passenger's position on a motorcycle seat.

U.S. Pat. No. 1,102,899 describes a supplemental seat attachment in the form of a back rest which includes a shock-absorbing spring for cushioning the back of a rider. The tension on the seat is adjustable to a slight degree for absorbing more or less impact, but the position of the seat is not adjustable. The seat according to U.S. Pat. No. 1,074,438 has a spring for absorbing shocks, but the position of the seat is also not adjustable. It is furthermore known from U.S. Pat. No. 3,486,767 to attach a shock absorber to the frame of the safety device which pushes against the chest of the rider. The device is only adjustable in position as far as the shock absorber will allow.

In U.S. Pat. No. 4,313,639 a motorcycle back rest is described which is infinitely adjustable in position, although the back rest does not absorb shock except through the cushion itself. Furthermore, after the position of the back rest is set, the back rest will no longer push against the back of the rider when the rider changes position. This is extremely important since motorcycle riders normally lean forward when moving. The back rest must be set back far enough to allow the rider to sit upright and mount and dismount the motorcycle. The rider will therefore receive no support from the back rest when leaning forward.

It is accordingly an object of the invention to provide a back support for motorcycle riders, which overcomes the hereinafore-mentioned disadvantages of the heretofore-known devices of this general type, and which will support the back of the rider regardless of the posture or position of the rider on the seat.

With the foregoing and other objects in view there is provided, in accordance with the invention a motorcycle having a seat for supporting a rider within a given seating range along the seat, comprising a support for the back of the rider, the support including a back rest, and means connected to the back rest for continuously biasing the back rest against the back of the rider regardless of the posture of the rider and the position occupied by the rider within the given seating range along the seat. In this way, the back of the rider will always be supported even when the rider moves forward or back or leans forward or back on the seat.

In accordance with another feature of the invention, the biasing means includes means for varying pressure applied to the back of the rider by the back rest. This will allow the rider to receive more or less support, as desired.

In accordance with an additional feature of the invention, the biasing means includes means for limiting movement of the back rest within a given movement range. This feature prevents the back rest from being pushed all the way forward by the biasing means or from being pushed all the way back by the rider.

In accordance with a further feature of the invention there is provided a first member connected to the back rest, and a second member connected to the motorcycle, the biasing means including at least one spring for rotating the first member relative to the second member.

In accordance with again another feature of the invention, the biasing means includes a hollow pipe connected to the first member, and the spring is disposed within the hollow pipe and connected between the hollow pipe and the second member.

In accordance with again an additional feature of the invention, the second member includes at least one hub rigidly connected thereto, the pipe is rotatably connected to the hub, and the spring is connected to the second member through the hub. In accordance with again a further feature of the invention, the biasing means includes means connected to the spring for manually increasing and decreasing tension on the spring.

In accordance with still a further feature of the invention, there is provided a first T-shaped element having a knob movable into and out of engagement with the hub and another pipe integral with the knob and protruding through the hub and partly through the first-mentioned hollow pipe, and a second T-shaped element having a bar disposed in and fastened to the first-mentioned hollow pipe and a rod integral with the bar and protruding partly into the other pipe, the spring being connected to the hub through the first T-shaped element when the knob is engaged with the hub and the spring being connected to the first-mentioned hollow pipe through the second T-shaped element, whereby tension on the spring is varied by rotating the knob. The tension can even be adjusted while the rider is on the seat.

In accordance with again an additional feature of the invention, there is provided a stop disposed on the knob being engageable in a cutout formed in the hub, the stop being pulled into the cutout by said spring.

In accordance with again another feature of the invention, there is provided a plate integral with the hollow pipe and adjacent the hub, and at least one fastener rigidly fastened to the hub and passing through at least one arcuate slot formed in the plate for limiting rotation of the hollow pipe relative to the hub.

In accordance with yet an additional feature of the invention, the hub has a chamber formed therein defining end walls, and including another bar integral with the other pipe and movable between the end walls, and another spring disposed between the other bar and one of the end walls for pulling the other pipe and the knob toward the first-mentioned bar and pulling the stop into the cutout. This ensures that the knob will always be locked in place.

In accordance with a concomittant feature of the invention, the first member is a frame on which the back rest is vertically movable, the frame including two first posts connected to the hollow pipe, the second member is two second posts each being disposed on a respective side of the seat, the at least one hub is two hubs each being fastened to a respective one of the second posts, the pipe extends from one of the hubs to the other, and the at least one spring is two springs disposed in the pipe, and including two arms each being connected to the motorcycle on a respective side of the seat, and two blocks connected to the arms and having holes formed therein for receiving the second posts, the second posts being adjustably movable in the blocks in longitudinal direction of the seat.

Other features which are considered as characteristic for the invention are set forth in the appended claims.

Although the invention is illustrated and described herein as embodied in a back support for motorcycles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
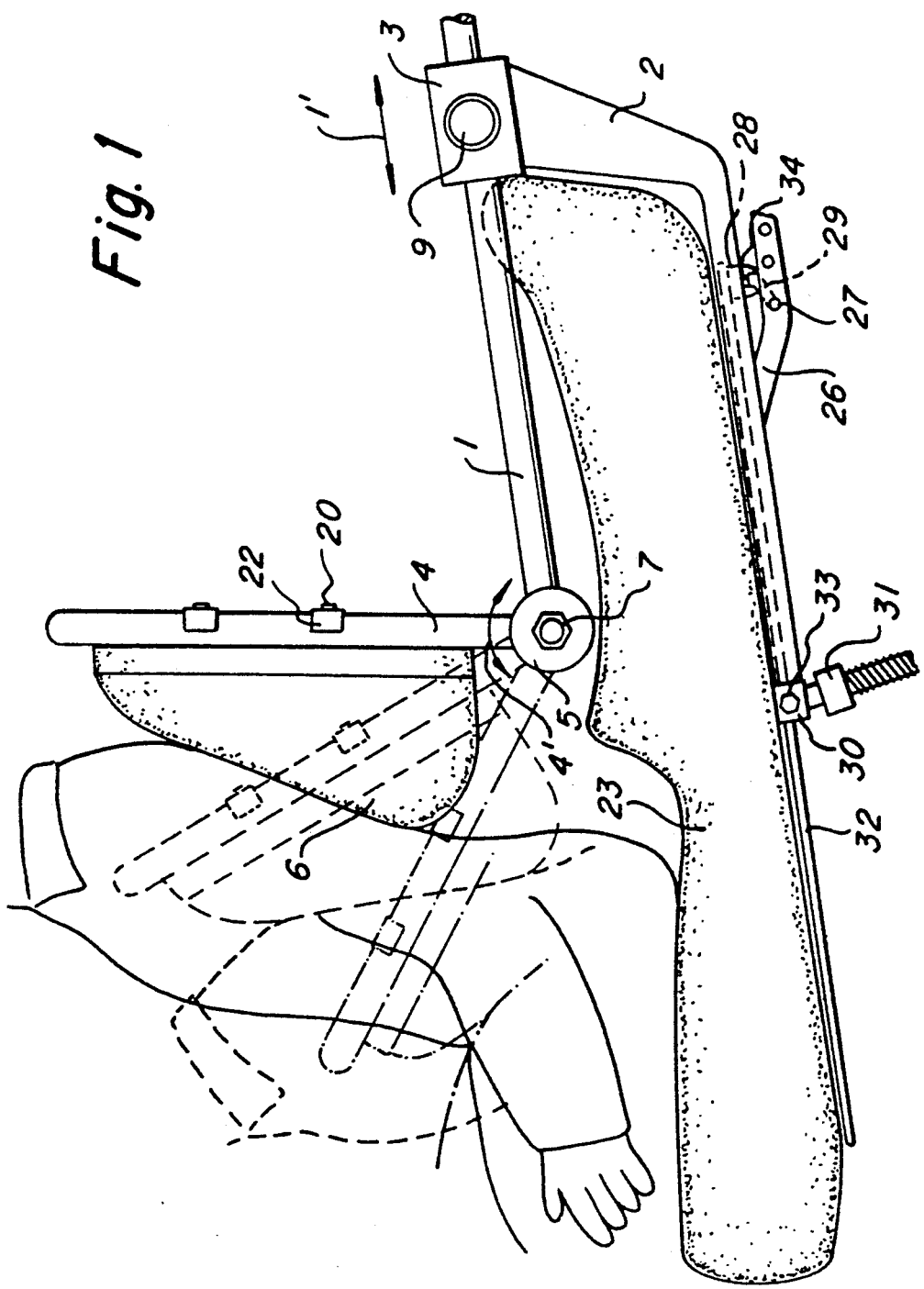
FIG. 1 is a fragmentary, diagrammatic, side-elevational view of the back support of the invention.

Referring now to the figures of the drawings in detail and first, particularly, to FIG. 1 thereof, there is seen a six-way back support for a motorcycle rider according to the invention, which is mounted to a conventional motorcycle seat 23.

The six-way support includes an orthopedically designed cushion on a back rest 6 for pressing against the back of the rider of the motorcycle, who is seated on the seat 23 facing toward the left in FIG. 1, thus giving support and cushioning shocks. The back rest 6 is movable up and down on a first member or frame including a first post 4 by loosening and tightening screws 20 holding brackets 22 of the back rest to the post 4.

The post 4 is pivotable on a hub 5 in the direction of the curved arrow 4'. As will be explained in greater detail below, the post 4 and the back rest 6 are spring biased to the left in FIG. 1, by a spring, which is adjustable in tension by a knob 7.

A second member or post 1 is solidly connected to the hub 5, such as by welding, so that the hub is actually part of the second member. The post 1 passes alongside the seat 23 and through a hole in a block 3 connected to an arm 2 and the post 1 is movable in the direction of the arrow 1' in the block 3, i.e. in the longitudinal direction of the seat, by loosening a knob 9 and pushing the post 1. The back rest 6 can therefore be used by a passenger on the right portion of the seat 23. The arm 2 ends in an L-shaped bracket 30 having a leg perpendicular to the plane of FIG. 1 which is connected to the arm 2 and another leg with a hole formed therein. The seat Z3 includes a frame 32 fastened to the motorcycle. A bolt 33 interconnects the bracket 30, the frame 32 and a shock absorber 31 which is also connected to the rear wheel of the motorcycle.

The arm 2 has a brace 26 connected thereto and the frame 32 has a tab 28 connected thereto. One hole 34 is formed in the tab 28 and a series of holes 27 are formed in the brace Z6. A strap 29 is connected between the tab 28 and the brace 26 by bolts passing through the holes 27, 34. This completes the mounting of the six-way support of the invention on the conventional seat 23. The six way movement is accomplished by the movement of the back rest 6 up and down, the movement of the first post 4 according to the arrow 4', and the movement of the second post 1 according to the arrow 1'. It is understood that the holes 27 make the mounting a universal mounting which can be mounted to motorcycle seats, or even to the motorcycle directly.

Figure 2:
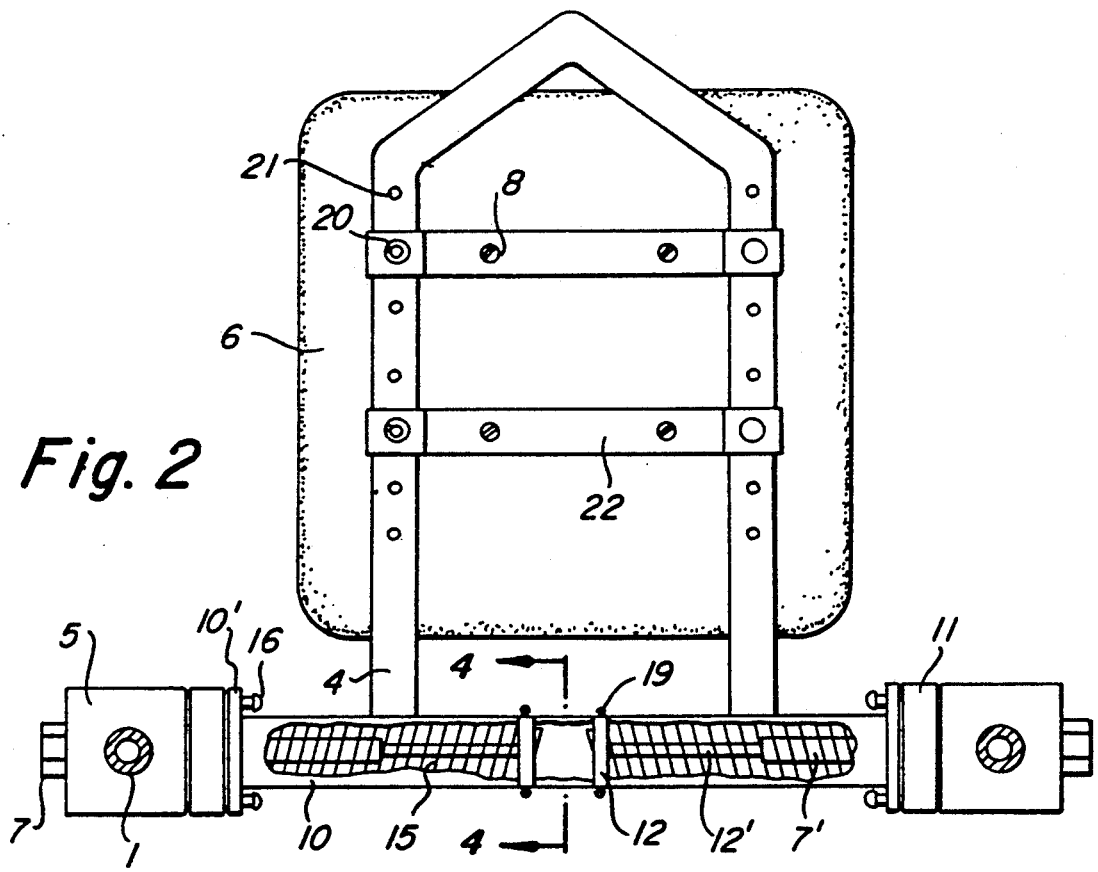
FIG. 2 is a rear-elevational view of FIG. 1, partly broken away.

In the rear-elevational view of FIG. 2, it can be seen that the brackets 22 are fastened to the back rest 6 by screws 8. When the back rest 6 is to be moved up or down, the screws 20 are placed in different holes 21 through the brackets.

FIG. 2 shows the location at which the posts 1 are connected to the hubs 5. A disc 11 is adjacent and coaxial to each respective hub 5. A plate 10' is adjacent each respective disc 11 and coaxial to the disc and hub on a respective side of the back rest 6. A hollow pipe 10 is connected between the two plates 10' and the posts 4 are connected to the pipe 10, such as by welding. The pipe may be connected to the plates 10' by welding, or it may be integral therewith. Screws 16 firmly hold the discs 11 to the hubs 5, but allow the plate 10' to rotate relative to the discs 11, as will be explained below.

It can be seen from the broken-away portion of FIG. 2 that two bars 12 are disposed in the pipe 10, and fastened perpendicular to the pipe by screws 19. A rod 12' is connected to or integral with each respective bar 12. A pipe 7' which is connected to or integral with the knob 7, is slipped partially over the rod 12'.

A spring 15 is attached to each bar 12 in order to bias the back rest 6 relative to the seat 23, as will be explained below.

Figure 3:
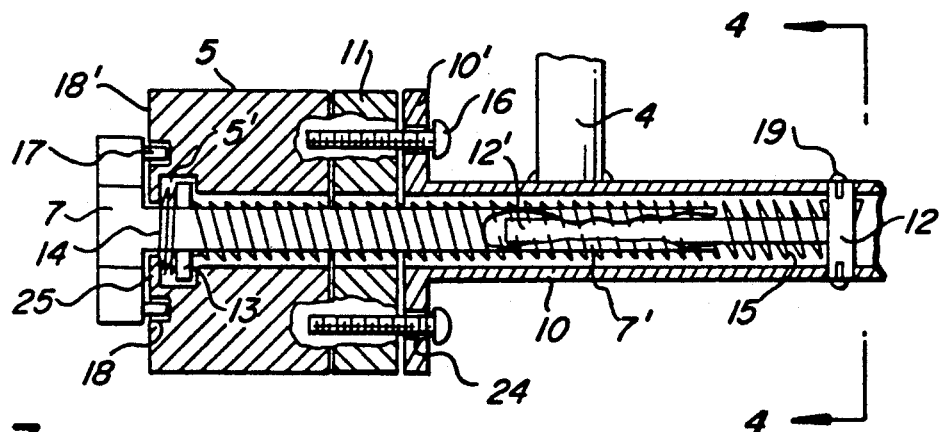
FIG. 3 is a fragmentary, partly cross-sectional and partly broken-away front-elevational view on an enlarged scale, taken along the lines III—III in FIG. 4, in the direction the arrows.

FIG. 3 is an enlarged cross-sectional view of a portion of the left side of FIG. 2. It can be seen from FIG. 3 that the hub 5 and the disc 11 have hollow central cores coextensive with the interior of the pipe 10. The pipe 7' extends from the knob 7 through the hollow cores of the hub 5 and the disc 11. Another bar 13 is connected to or integral with the pipe 7'. One end of the spring 15 is attached to the bar 13, and as mentioned above, the other end is attached to the bar 12.

The knob 7 has stops 17 formed thereon, which are engageable in cutouts 18 formed in a lateral surface 18' of the hub 5. In the position shown in FIG. 3, the stops 17 are locked in the cutouts 18. Naturally, the hub 5 is fixed to the motorcycle through the post 1, the arm 2 and the seat 23. It can thus be seen that the torque of the torsion spring 15 is passed on from the stationary hub 5, knob 7 and bar 13 to the back rest 6, since the bar 12, pipe 10, plate 10' and post 4 are rotatable by the spring 15 relative to the bar 13.

When it is desired to increase or decrease the spring force which the back rest 6 applies to the back of the rider, the knob 7 is manually grasped, pulled out (sliding the pipe 7' on the rod 12'), and rotated clockwise or counterclockwise. Even if the spring force is greatly reduced, the tension on the spring 15 is enough to pull the knob 7 toward the hub 5, allowing the stops 7 to engage in the cutouts 18 after a slight rotation caused by the spring.

As an alternative, greater locking security may be provided by forming a flange 25 within the hollow core of the hub 5, defining a deeper cutout region 5'. In this case, a small compression spring 14 is placed on the pipe 7' in the region 5' before assembly. The spring 14 pushes the bar 13 away from the flange 25, pulling the stops 17 into the cutouts 18 when the knob 7 is released.

Figure 4:
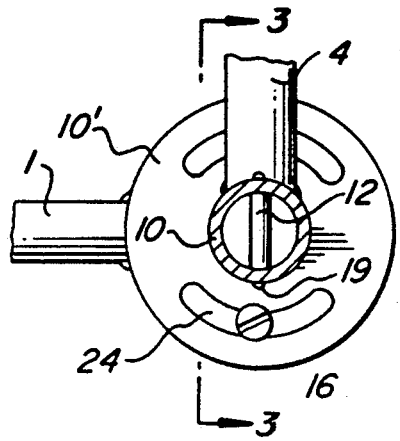
FIG. 4 is a fragmentary, side-elevational view taken along the line IV—IV in FIG. 3, in the direction of the arrows.

Whenever a driver is not present on the seat 23, the spring 15 would tend to push the back rest 6 to the left in FIG. 1 flat against the seat 23. Therefore, a mechanism is provided for limiting the motion of the back rest 6. Making reference to FIG. 4, it can be seen that two arcuate slots 24 are formed in the plate 10'. Two fasteners such as screws 16 protrude through the slots 24, so that the plate 10' can only rotate until the screws 16 hit the ends of the slots.

Naturally, the screws 16 must have a high shear strength. Besides preventing the back rest 6 from moving too far to the left in FIG. 2, they also prevent the back rest from moving too far to the right, so that there will be an end position beyond which the driver cannot push the back rest to the right.

The lengths of the slots can be selected at will and it is possible to place a collar over the plate 10' to shorten the slots. The collar has slots formed therein in alignment with the slots 24, and by rotating the collar with respect to the plate 10', portions of the collar cover portions of the slots 24, limiting movement of the screws 16. Other screws pass through the collar into threaded holes in the plate 10' to hold the plate and collar in the desired position. Regardless of how short the slots 24 are made, the back rest 6 will be able to apply pressure to the back of the rider or passenger in whatever position the rider occupies on the seat 23. It is impossible to move out of range of the back rest 6. This is of utmost importance since a driver will normally lean forward when moving at high speed and sit erect when moving slowly or stopped.

We claim:

1. In a motorcycle having a seat with a given length, a front edge and a rear edge defining an upper surface over the entire given length between the edges for supporting a rider sitting on the upper surface within a given seating range along the upper surface between the front and rear edges of the given length of the seat, the improvement comprising a support for the back of the rider, said support including a back rest, and means connected to said back rest for continuously biasing said back rest against the back of the rider regardless of the angle formed by the back of the rider and the upper surface and regardless of the location of the rider within the given seating range along the entire given length of the seat.

2. Back support according to claim 1, wherein said biasing means includes means for manually varying pressure applied to the back of the rider by said back rest.

3. Back support according to claim 1, wherein said biasing means includes means for limiting movement of said back rest within a given movement range.

4. Back support according to claim 1, including a first member connected to said back rest, and a second member connected to the motorcycle, said biasing means including at least one spring for rotating said first member relative to said second member.

5. Back support according to claim 4, wherein said biasing means includes a hollow pipe connected to said first member, and said spring is disposed within said hollow pipe and connected between said hollow pipe and said second member.

6. Back support according to claim 5, wherein said second member includes at least one hub rigidly connected thereto, said pipe is rotatably connected to said hub, and said spring is connected to said second member through said hub.

7. In a motorcycle having a seat with a given length, a front edge and a rear edge defining an upper surface over the entire given length between the edges for supporting a rider sitting on the upper surface within a given seating range along the upper surface between the front and rear edges of the given length of the seat, the improvement comprising a support for the back of the rider, said support including a back rest, means connected to said back rest for continuously biasing said back rest against the back of the rider regardless of the angle formed by the back of the rider and the upper surface and regardless of the location of the rider within the given seating range along the entire given length of the seat, a first member connected to said back rest, a second member connected to the motorcycle, said biasing means including at least one spring for rotating said first member relative to said second member and a hollow pipe connected to said first member, said spring being disposed within said hollow pipe and connected between said hollow pipe and said second member, said second member including at least one hub rigidly connected thereto, said pipe being rotatably connected to said hub, and said spring being connected to said second member through said hub, a first T-shaped element having a knob movable into and out of engagement with said hub and another pipe integral with said knob and protruding through said hub and partly through said first-mentioned hollow pipe, and a second T-shaped element having a bar disposed in and fastened to said first-mentioned hollow pipe and a rod integral with said bar and protruding partly into said other pipe, said spring being connected to said hub through said first T-shaped element when said knob is engaged with said hub and said spring being connected to said first-mentioned hollow pipe through said second T-shaped element, whereby tension on said spring is varied by rotating said knob.

8. Back support according to claim 4, wherein said biasing means includes means connected to said spring for manually increasing and decreasing tension on said spring.

9. Back support according to claim 5, wherein said biasing means includes means connected to said spring for manually increasing and decreasing tension on said spring.

10. Back support according to claim 6, wherein said biasing means includes means connected to said spring for manually increasing and decreasing tension on said spring.

11. Back support according to claim 7, including a stop disposed on said knob being engageable in a cutout formed in said hub, said stop being pulled into said cutout by said spring.

12. Back support according to claim 6, including a plate integral with said hollow pipe and adjacent said hub, and at least one fastener rigidly fastened to said hub and passing through at least one arcuate slot formed in said plate for limiting rotation of said hollow pipe relative to said hub.

13. Back support according to claim 7, including a plate integral with said hollow pipe and adjacent said hub, and at least one fastener rigidly fastened to said hub and passing through at least one arcuate slot formed in said plate for limiting rotation of said hollow pipe relative to said hub.

14. Back support according to claim 11, wherein said hub has a chamber formed therein defining end walls, and including another bar integral with said other pipe and movable between said end walls, and another spring disposed between said other bar and one of said end walls for pulling said other pipe and said knob toward said first-mentioned bar and pulling said stop into said cutout.

15. In a motorcycle having a seat with a given length, a front edge and a rear edge defining an upper surface over the entire given length between the edges for supporting a rider sitting on the upper surface within a given seating range along the upper surface between the front and rear edges of the given length of the seat, the improvement comprising a support for the back of the rider, said support including a back rest, means connected to said back rest for continuously biasing said back rest against the back of the rider regardless of the angle formed by the back of the rider and the upper surface and regardless of the location of the rider within the given seating range along the entire given length of the seat, a first member connected to said back rest, a second member connected to the motorcycle, said biasing means including at least one spring for rotating said first member relative to said second member and a hollow pipe connected to said first member, said spring being disposed within said hollow pipe and connected between said hollow pipe and said second member, said second member including at least one hub rigidly connected thereto, said pipe being rotatably connected to said hub, said spring being connected to said second member through said hub, said first member being a frame on which said back rest is vertically movable, said frame including two first posts connected to said hollow pipe, said second member being two second posts each being disposed on a respective side of the seat, said at least one hub being two hubs each being fastened to a respective one of said second posts, said pipe extending from one of said hubs to the other, and said at least one spring being two springs disposed in said pipe, two arms each being connected to the motorcycle on a respective side of the seat, and two blocks connected to said arms and having holes formed therein for receiving said second posts, said second posts being adjustably movable in said blocks in longitudinal direction of the seat.

16. Back support according to claim 1, wherein said biasing means includes means for angularly rotating said back rest into an infinite number of positions with respect to the seat.

17. Back support according to claim 1, including means for vertically moving said back rest into a number of positions within a given vertical distance and means for horizontally moving said back rest into an infinite number of positions over the entire length of the seat, and said biasing means includes means for angularly rotating said back rest into an infinite number of positions with respect to the seat.

* * * * *